United States Patent
Nelson et al.

(10) Patent No.: US 6,647,794 B1
(45) Date of Patent: Nov. 18, 2003

(54) ABSOLUTE PRESSURE SENSOR

(75) Inventors: Daniel S. Nelson, Chaska, MN (US); David J. Hillman, Prescott, WI (US); John McIntire, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/139,892

(22) Filed: May 6, 2002

(51) Int. Cl.[7] .................................................. G01L 9/12
(52) U.S. Cl. ........................................... 73/718; 73/724
(58) Field of Search .......................... 73/718, 724, 756, 73/708; 361/283.1–283.4

(56) References Cited

U.S. PATENT DOCUMENTS

| | | | |
|---|---|---|---|
| 4,695,817 A | | 9/1987 | Kurtz et al. ................... 338/4 |
| 4,773,269 A | | 9/1988 | Knecht et al. ................. 73/706 |
| 4,790,192 A | | 12/1988 | Knecht et al. ................. 73/721 |
| 4,864,463 A | * | 9/1989 | Shkedi et al. ............. 361/283.4 |
| 4,970,898 A | | 11/1990 | Walish et al. .................. 73/706 |
| 5,369,544 A | * | 11/1994 | Mastrangelo ............. 361/283.4 |
| 5,381,299 A | * | 1/1995 | Provenzano et al. ...... 361/283.4 |
| 5,448,444 A | * | 9/1995 | Provenzano et al. ...... 361/283.4 |
| 5,463,628 A | * | 10/1995 | Sorensen ..................... 370/467 |
| 5,631,428 A | * | 5/1997 | Catanescu et al. ............ 73/724 |
| 5,695,590 A | | 12/1997 | Willcox et al. ........... 156/272.2 |
| 6,083,179 A | * | 7/2000 | Oredsson ..................... 600/587 |

* cited by examiner

Primary Examiner—William Oen
(74) Attorney, Agent, or Firm—Westman, Champlin & Kelly

(57) ABSTRACT

A barometric pressure sensor including a base layer, a sensor layer and a reference layer. The base layer has a passageway between a pressure inlet and a mounting face. The sensor layer is bonded by an insulating bond to the mounting face and includes a conductive diaphragm. The reference layer is mounted on the sensor layer to form a reference vacuum cavity. The reference layer includes a conducting surface facing the conductive diaphragm across the reference vacuum cavity to form a pressure sensing capacitor.

25 Claims, 9 Drawing Sheets

ABSOLUTE PRESSURE SENSOR

BACKGROUND OF THE INVENTION

In industrial transmitter applications, capacitive type sensors are typically used for sensing pressures. Capacitive sensors can be made highly accurate and repeatable. In gage transmitters that electronically calculate a pressure difference based on two absolute pressure sensor outputs, accuracy and repeatability of the sensors are particularly important to avoid introducing errors in the subtraction process. The barometric pressure range is quite limited, typically 0.9–1.1 atmospheres, and there is a desire to use a relatively low cost absolute sensor for sensing barometric pressure. Low cost absolute pressure sensors, however, often do not have the accuracy and repeatability found in process fluid sensors. These low cost sensors can introduce undesired errors into the electronic subtraction process.

A barometric pressure sensor is needed that can be manufactured at a low cost and that has high repeatability in the limited barometric pressure range.

SUMMARY OF THE INVENTION

Disclosed is a pressure sensor comprising a base layer, a sensor layer and a reference layer. The base layer surrounds a passageway between an inlet adapted to receive a pressure and a mounting face on the base layer.

The sensor layer has a first face bonded by an insulating bond to the mounting face. The sensor layer includes a conductive diaphragm aligned with the passageway.

The reference layer mounts on the sensor layer to form a reference vacuum cavity that is aligned with the conductive diaphragm. The reference layer includes a conducting surface facing the conductive diaphragm across the reference vacuum cavity to form a pressure sensing capacitor.

These and various other features as well as advantages which characterize the present invention will be apparent upon reading of the following detailed description and review of the associated drawings.

DETAILED DESCRIPTION OF THE PREFERRED EMBODIMENTS

Gage pressure transmitters are often used to measure a quantity of liquid stored in a tank. The gage pressure transmitter includes an electronic circuit that provides a transmitter output indicating gage pressure, or in other words, a difference between a sensed liquid pressure and a sensed barometric pressure. The gage pressure transmitter has a process pressure inlet that connects to an opening near the bottom of the tank. The gage pressure transmitter also has an atmospheric inlet or vent that is open to the atmosphere. The fluid level in the tank can be calculated from the transmitter's gage pressure output using well known formulae.

Gage pressure transmitters can be constructed using one differential pressure sensor that couples to both the process pressure and atmospheric pressure. Alternatively, two absolute pressure sensors can be used, with one absolute pressure sensor sensing the liquid pressure and the other absolute pressure sensor sensing the atmospheric pressure. When two absolute pressure sensors are used, a circuit in the transmitter calculates the pressure difference (gage pressure) electronically based on the two sensor outputs.

In industrial transmitter applications, capacitive type sensors are typically used for sensing pressures. Capacitive sensors can be made highly accurate and repeatable. In gage transmitters that electronically calculate a pressure difference based on two absolute pressure sensor outputs, repeatability of the sensors is particularly important to avoid introducing errors in the subtraction process. The barometric pressure range is quite limited, typically 0.9–1.1 atmospheres, and there is a desire to use a relatively low cost absolute sensor for sensing barometric pressure. Low cost absolute pressure sensors, however, often do not have the repeatability found in process fluid sensors. These low cost sensors can introduce undesired errors into the electronic subtraction process.

As illustrated below in FIGS. 1–11, barometric pressure sensors are provided that can be manufactured at a low cost and that have high repeatability in the limited barometric pressure range. The barometric pressure sensors can be conveniently batch fabricated with selected known processes of microstructure fabrication (also called microsystem technology (MST)) such as masking, doping, etching, thin film deposition and the like. These known processes include many adapted from the manufacture of integrated circuits.

Figure 1:
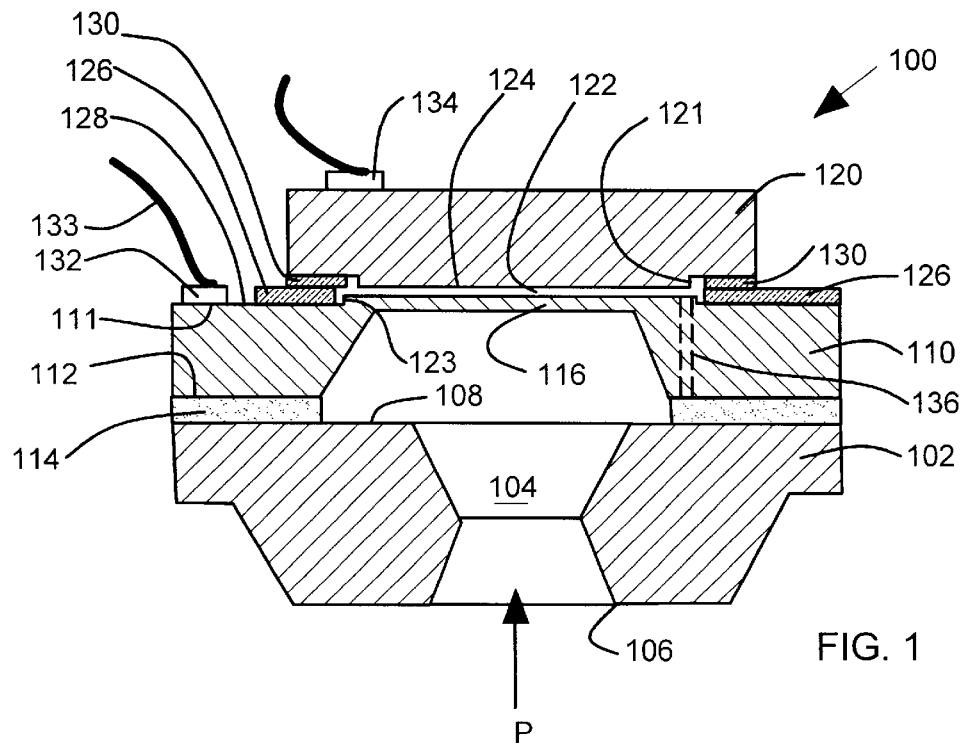
FIG. 1 illustrates a cross-sectional view of a first embodiment of a capacitive absolute pressure sensor.
Figure 10:
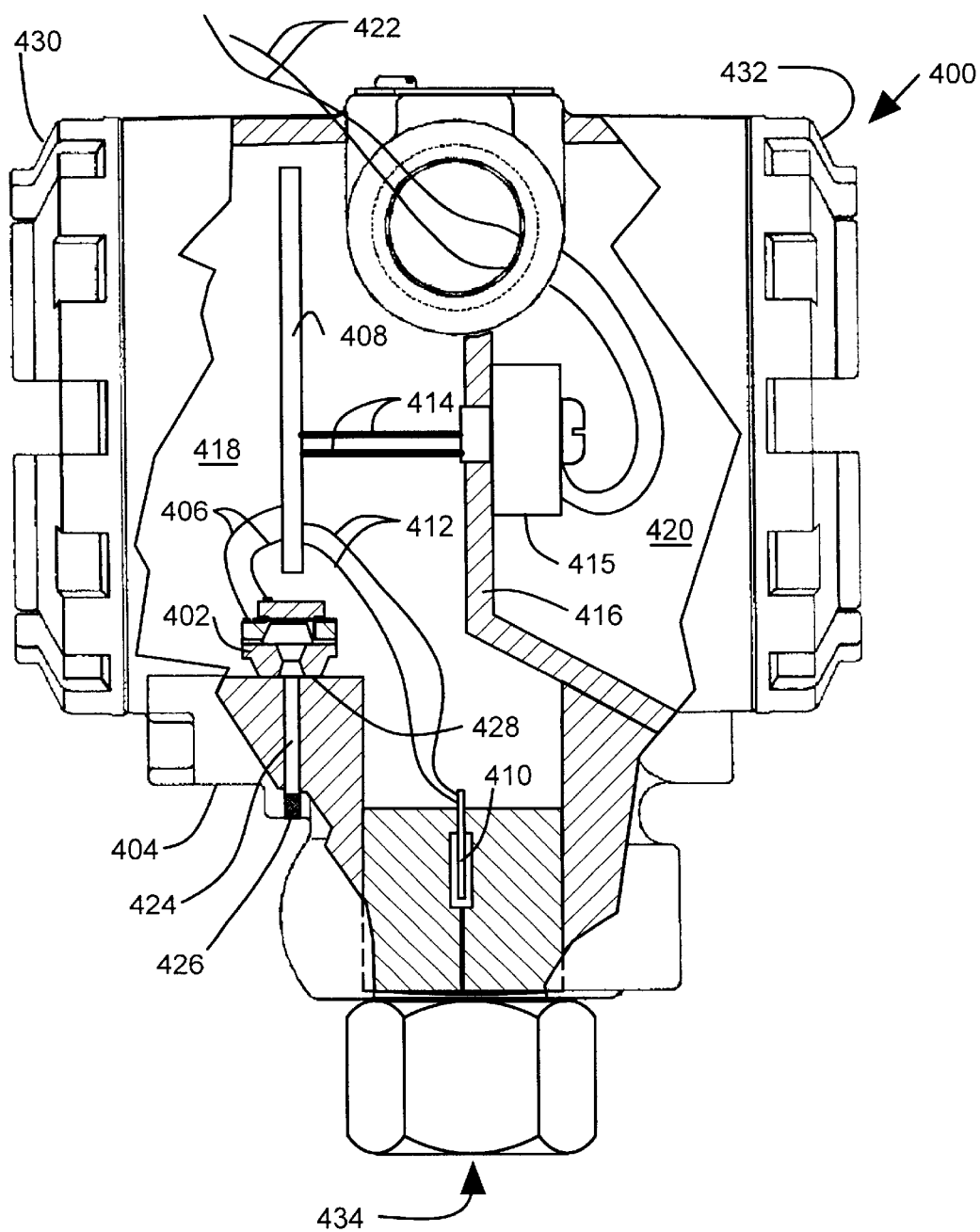
FIG. 10 illustrates a partially broken away view of a gage pressure transmitter.

FIG. 1 illustrates a pressure sensor 100 that is formed of multiple layers and that can be conveniently batch fabricated. The pressure sensor 100 includes a base layer 102 that surrounds a passageway 104 between an inlet 106 and a mounting face 108 on the base layer. Inlet 106 is adapted to bond to a gage transmitter housing internal surface surrounding a hole (as illustrated in FIG. 10) providing an atmospheric pressure P from outside a gage transmitter housing.

The pressure sensor 100 also includes a sensor layer 110 having a first face 112 bonded by an insulating bond 114 to the mounting face 108. The sensor layer 110 includes a conductive diaphragm 116 that is aligned with the passageway 104 to receive pressure P.

The pressure sensor 100 includes a reference layer 120 that is mounted on the sensor layer 110 to form a reference vacuum cavity 122 that is aligned with the conductive diaphragm 116. The reference layer 120 includes a conducting surface 124 facing the conductive diaphragm 116 across the reference vacuum cavity 122 to form a pressure sensing capacitor. Reference layer 120 is sufficiently thick so that that reference layer 120 does not bend or deflect substantially with changes in atmospheric pressure around the sensor 100. The reference layer 120 preferably includes a mesa 121 that protrudes slightly and that faces the conductive diaphragm 116. The mesa 121 has a height that is selected to provide the desired spacing between capacitor plates in the vacuum cavity 122. The height of mesa 121 can be selected to correct for the thickness of bonding layers 126, 130. In addition to the mesa 121, or as an alternative to the mesa 121, a second mesa 123 can be provided on the sensor layer 110 to provide capacitor spacing control.

The conductive diaphragm 116 serves as a first capacitor electrode or plate. The conducting surface 124 serves as a second capacitor electrode or plate. The vacuum cavity 122 provides a spacing between the generally parallel capacitor plates. The spacing between the capacitor plates varies as the diaphragm 116 is deflected by pressure P. The insulating bond 114 provides electrical insulation from the base layer 102 and preferably comprises a layer of glass frit.

The sensor layer 110 further includes a first insulating layer 126 surrounding the conducting diaphragm 116 on a second face 128. The reference layer 120 includes a second insulating layer 130 bonded to the first insulating layer 126. In one preferred arrangement, the reference layer 120 and the sensor layer 110 comprise silicon and the first and second insulating layers 126, 130 comprise grown silicon dioxide and are fusion bonded together. The silicon in layers 110, 120 is doped and electrically conductive. The insulating layers 126, 130 insulate the conductive portions of the sensor layer 110 from the reference layer 120 so that the pressure sensing capacitor is not shorted out.

A first electrical bonding pad 132 is disposed on the sensor layer 110. Bonding pad 132 is electrically in contact with and connected to the sensor layer 110 and thus provides one connection to a plate or electrode of the a pressure sensing capacitor. A second electrical bonding pad 134 is electrically in contact with and connected to the conducting surface 124 on the reference layer 120 and thus provides a connection to the other plate or electrode of the pressure sensing capacitor.

In a preferred arrangement, the sensor layer 110 includes a shelf portion 111 on one side that extends beyond the reference layer 120, and at least one electrical bonding pad 132 is disposed on the shelf portion. The arrangement of this shelf portion 111 provides easy access for connecting a bond wire 133 and allows the bond pad 132 to be spaced away from the conductive diaphragm 116 so that stress transmission from the bond wire 133 to the conductive diaphragm 116 is reduced.

In a preferred arrangement, the sensor layer 110 further comprises a second passageway 136 extending from the reference vacuum cavity 122 to the insulating bond 114. After the reference layer 120 and sensor layer 110 are bonded together, then the base layer 102 is bonded to the sensor layer 110 in a vacuum. The insulating bond or frit 114 seals the second passageway 136 to provide a permanent vacuum in reference vacuum cavity 122. The second passageway 136 is preferably a laser drilled hole.

The pressure sensor 100 can be economically manufactured for use as a barometric pressure sensor having an operating range of about 0.9–1.1 standard atmospheres.

Figure 2:
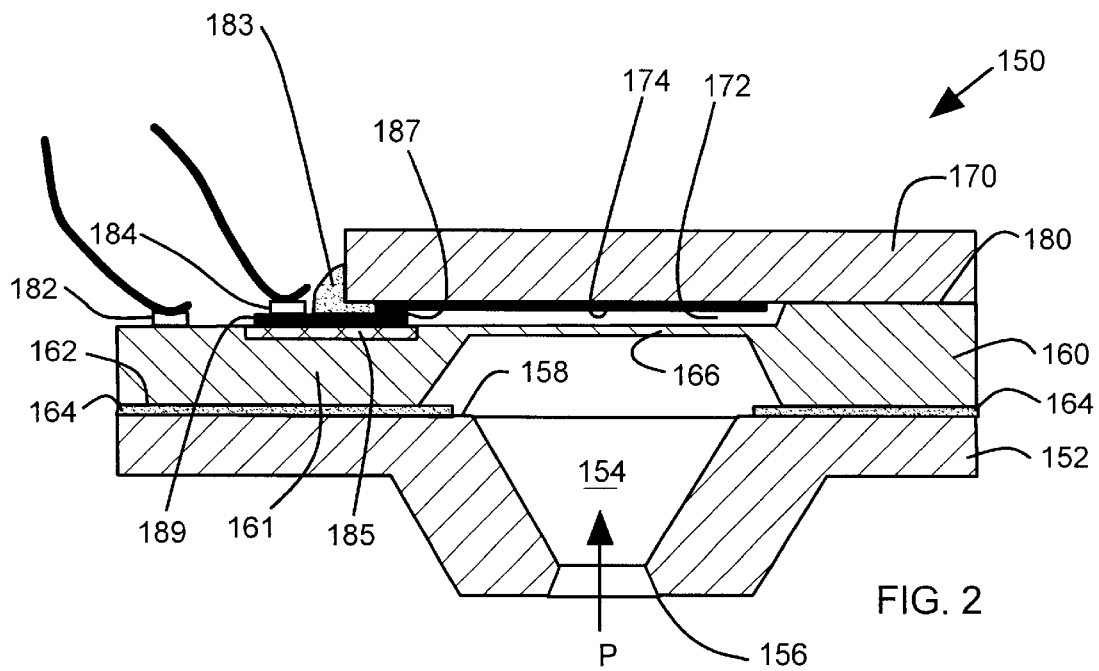
FIG. 2 illustrates a cross-sectional view of a second embodiment of a capacitive absolute pressure sensor.

FIG. 2 illustrates a pressure sensor 150 that is similar to the pressure sensor 100 shown in FIG. 1, however, the pressure sensor 150 includes a reference layer 170 that is an insulating glass anodically bonded to a sensor layer 160 by way of an anodic bond 180.

In FIG. 2, a base layer 152 surrounds a passageway 154 between an inlet 156 that receives a pressure P and a mounting face 158 on the base layer 152.

The sensor layer 160 has a first face 162 that is bonded by an insulating bond 164 to the mounting face 158. The sensor layer 160 includes a conductive diaphragm 166 aligned with the passageway 154. The insulating bond 164 preferably comprises a layer of glass frit.

The reference layer 170 is mounted on the sensor layer 160 to form a reference vacuum cavity 172 that is aligned with the conductive diaphragm 166. The reference layer 170 includes a conducting surface 174 facing the conductive diaphragm 166 across the reference vacuum cavity 172 to form a pressure sensing capacitor. The bulk of the reference layer 170 preferably comprises pyrex glass, and the conducting surface 174 preferably comprises a deposition of nichrome. Reference layer 170 is anodically bonded to sensor layer 160 using the well known anodic bonding technique for bonding pyrex to silicon. After the anodic bond 180 is complete, then the sensor is heated in a vacuum to seal the reference vacuum cavity 172 with a small quantity of glass frit 183. Glass frit 183 fills a small channel that is cut through the reference layer to allow an electrical feedthrough to a first electrical bonding pad 184 from the conducting surface 174.

The first electrical bonding pad 184 is deposited on electrical conductor layer 189 that connects to the conducting surface 174 which forms a second plate or electrode of the pressure sensing capacitor. The first electrical bonding pad 184 and electrical conductor layer 189 are disposed on an isolation channel 185 on the sensor layer 160. The electrical conductor layer 189 is in electrical contact with the conducting surface 174 by way of a metal bridge 187.

A second electrical bonding pad 182 is disposed on the sensor layer 160 and thus connects to the conducting diaphragm 166 which forms one plate or electrode of the pressure sensing capacitor. The second electrical bonding pad 182 is in electrical contact with the sensor layer 160.

The bonding pads 182, 184 are preferably formed of aluminum. The isolation channel 185 is preferably formed of pyrolytic oxide. The metal bridge 187, the electrical conductor layer 189 and the conducting surface 174 are all preferably formed of nichrome. The sensor layer 160 includes a shelf portion 161 that extends beyond the reference layer 170 and the electrical bonding pads 182, 184 are disposed on the shelf portion.

The pressure sensor 150 is preferably a barometric pressure sensor having an operating range of about 0.9–1.1 atmospheres.

Figure 3:
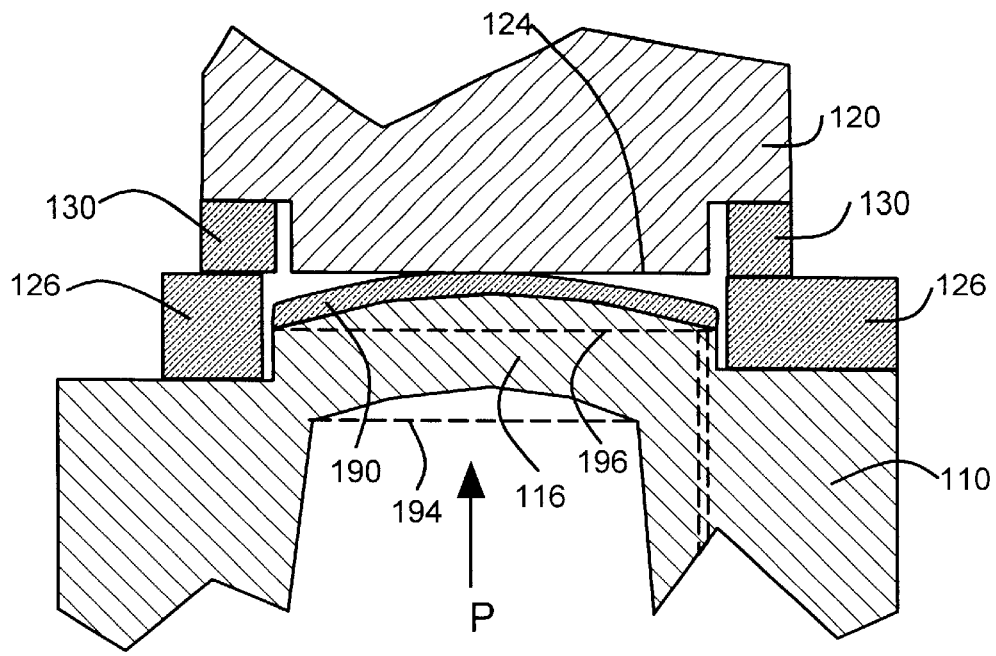
FIG. 3 illustrates a detailed cross-sectional view of a first diaphragm of a capacitive absolute pressure sensor.
Figure 4:
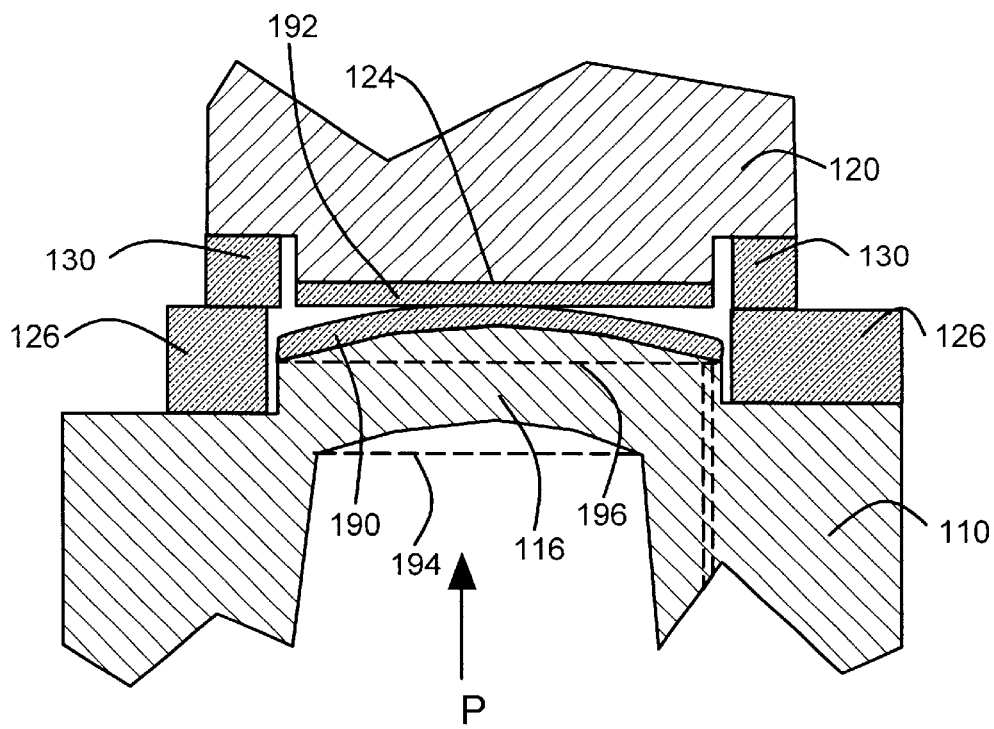
FIG. 4 illustrates a detailed cross-sectional view of a second diaphragm of a capacitive absolute pressure sensor.

FIGS. 3–4 illustrate detailed cross-sectional views of two different embodiments of conductive diaphragms 116 of a capacitive absolute pressure sensor such as pressure sensor 100 illustrated in FIG. 1. FIGS. 3–4 are not drawn to scale, but have an expanded vertical scale to better illustrate certain features. Also, FIGS. 3–4 are illustrations of the conductive diaphragms 116 during overpressure conditions. An overpressure condition is a condition where the pressure P exceeds the nominal measurement range of the pressure sensor. Under overpressure conditions the conductive diaphragm 116 deflects away from its nominal flat shape (illustrated by dashed lines 194, 196) and rests against and is supported by the conducting surface 124 of reference layer 120. In FIGS. 3–4, an oxide layer 190 is formed on the diaphragm surface. In addition, in FIG. 4 an additional oxide layer 192 is formed on the conducting surface 124. The oxide layers 190, 192 prevent the conducting surface 124 from shorting out to the conductive diaphragm 116 during overpressure conditions. The conductive diaphragm 116 is supported during overpressure conditions so that is does not break, and the oxide layers 190, 192 prevent a short circuit during the overpressure condition.

FIGS. 5–9 illustrate a pressure sensor 200 that is similar to the pressure sensor 100 illustrated in FIG. 1, however the pressure sensor 200 includes some additional features. In particular, grooves 201, which can be used to reduce rest capacitance, are included. An additional masked insulating layer 203 can be included to provide enhanced performance over temperature extremes. A cul-de-sac shaped passageway (FIG. 6) can be added in reference layer 120 between the reference vacuum cavity 122 and the second passageway 136 to reduce movement of debris from laser drilling.

Figure 5:
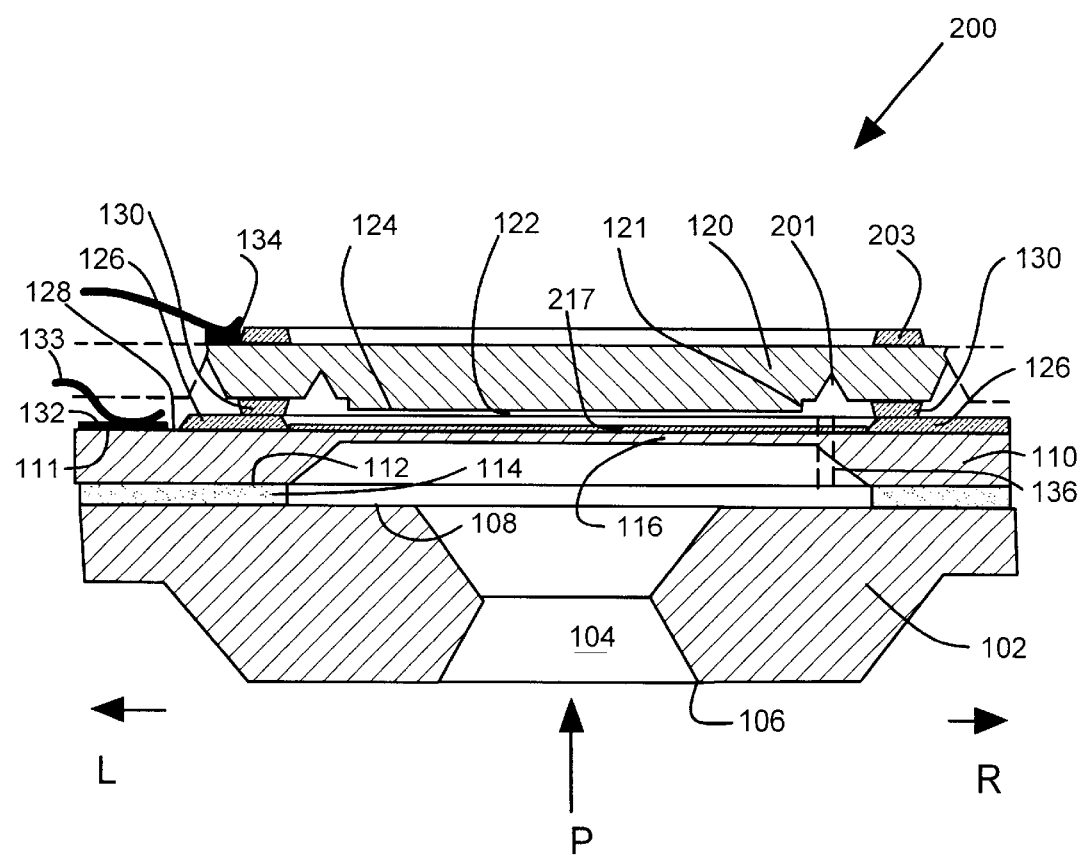
FIG. 5 illustrates a cross-sectional view of a third embodiment of a capacitive absolute pressure sensor.

FIG. 5 illustrates a pressure sensor 200 that is formed of multiple layers and that can be conveniently batch fabricated using known processes of microstructure fabrication (also called microsystem technology (MST)) such as masking, doping, etching, thin film deposition and the like. The pressure sensor 200 illustrated in FIG. 5 is similar to the pressure sensor 100 illustrated in FIG. 1. The reference numerals used in FIG. 5 that are the same as reference numerals used in FIG. 1 identify the same or similar features.

Figure 9:
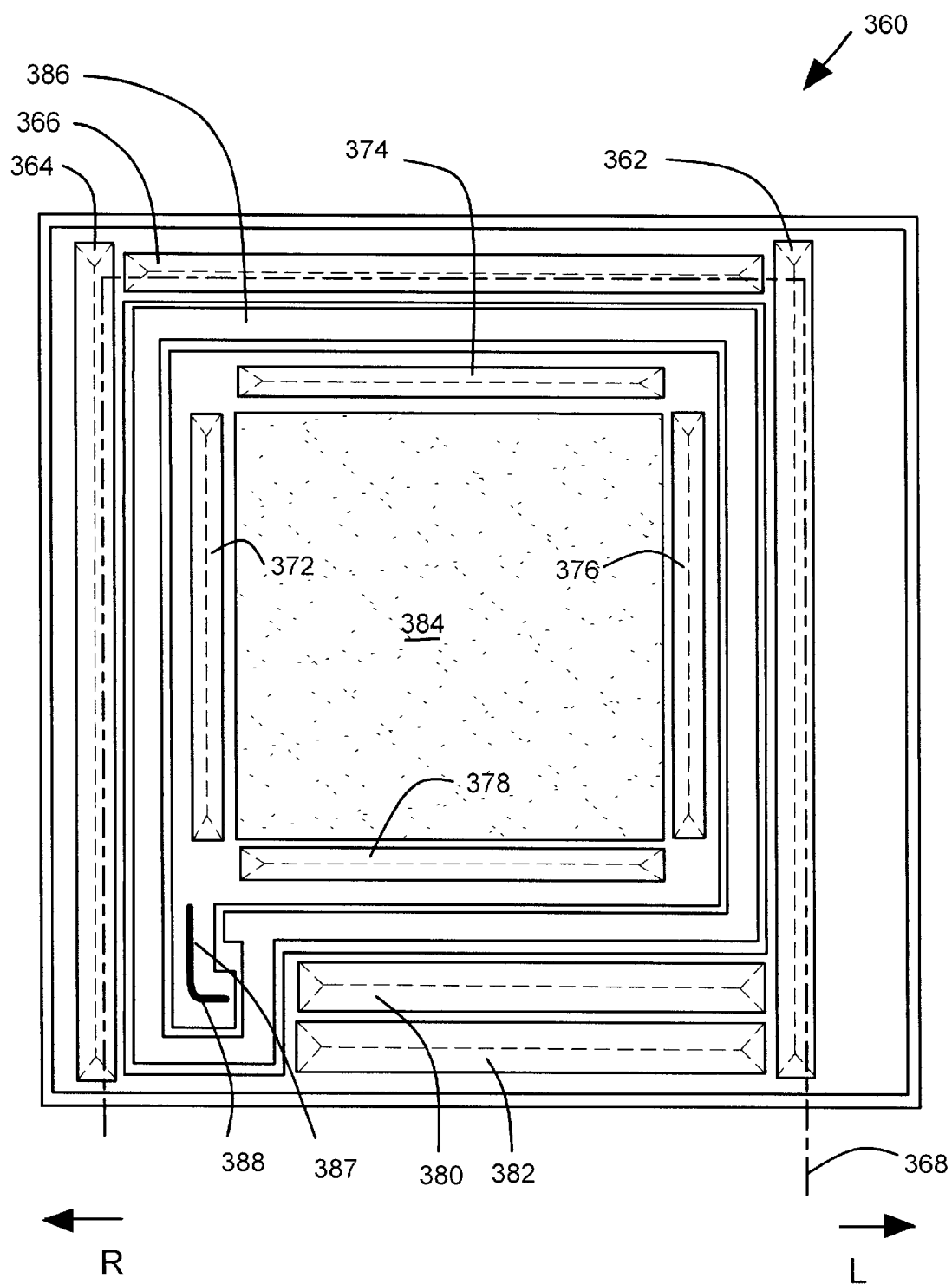
FIG. 9 illustrates a mask for a bottom surface of the reference layer shown in FIG. 5.

In FIG. 5, the pressure sensor 200 includes multiple grooves 201 (also illustrated in FIG. 9 at 372, 374, 376, 378.

In a preferred embodiment, the second insulating layer 130 is masked to form a masked shape and the reference layer 120 also includes a third insulating layer 203 opposite the second insulating layer 130. The third insulating layer 203 is masked in substantially the same masked shape as the second insulating layer 130. The third insulating layer 203 is aligned with the second insulating layer 130. As temperature changes, the first and second insulating layers 203, 130 expand at a different rate than the expansion of the bulk material of reference layer 120. The difference in rates of expansion produces stress in reference layer 120, however, the stresses from the two substantially identical layers 203, 130 tend to cancel out. This feature of masking with substantially the same masked shape is described in more detail below in connection with FIGS. 8–9.

In another preferred embodiment, a thin oxide layer 217 is provided on sensor layer 110. Oxide layer 217 is similar to oxide layer 190 illustrated in FIGS. 3–4 and prevents shorting out during overpressure conditions.

FIGS. 6–9 illustrate various masks that are used in manufacture of the sensor 200 illustrated in FIG. 5. References L (left) and R (right) are included in FIG. 5 to identify left and right sides of the sensor 200. Corresponding references L and R are included in FIGS. 6–9 to indicate the orientation of the various masks relative to sensor 200 in FIG. 5. The masks illustrated in FIGS. 6–9 provide additional details on the shapes of various features shown in FIG.5. The masks in FIGS. 6–9 are illustrative for manufacture of one sensor. It will be understood by those skilled in the art that a sensor can be batch fabricated with many other sensors on wafers and then diced. In the case of batch fabrication, the individual masks illustrated in FIGS. 6–9 are typically repeated in regular arrays on masks large enough to complete entire wafers.

Figure 6:
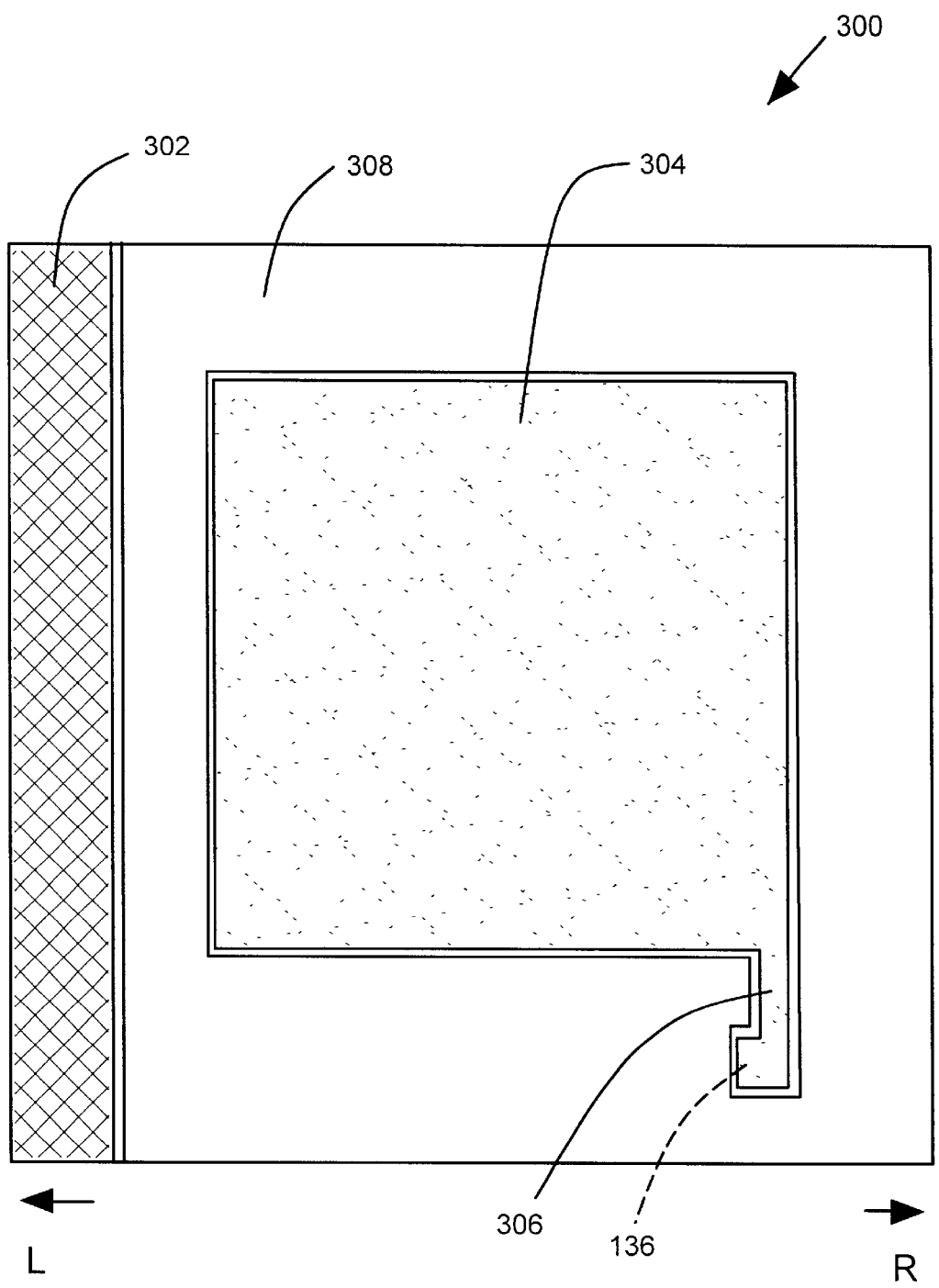
FIG. 6 illustrates a mask for a top surface of the sensor layer shown in FIG. 5.

FIG. 6 illustrates a mask 300 for a second face 128 (top surface) of the sensor layer 110 shown in FIG. 5. Mask 300 includes a generally rectangular region 302 that provides for a correspondingly shaped surface of bare (unoxidized) silicon. The first electrical bonding pad 132 is later deposited on this bare silicon region 302. Mask 300 also includes a region 304 that overlies the conductive diaphragm 116 and also defines a cul-de-sac region 306 that is contiguous with the region 304. The cul-de-sac region 306 provides an open path between the second passageway 136 and the reference vacuum cavity 122. Mask 300 includes an irregular shaped region 308 that defines the first insulating layer 126 which surrounds the conductive diaphragm region 304 and the cul-de-sac region 306.

Figure 7:
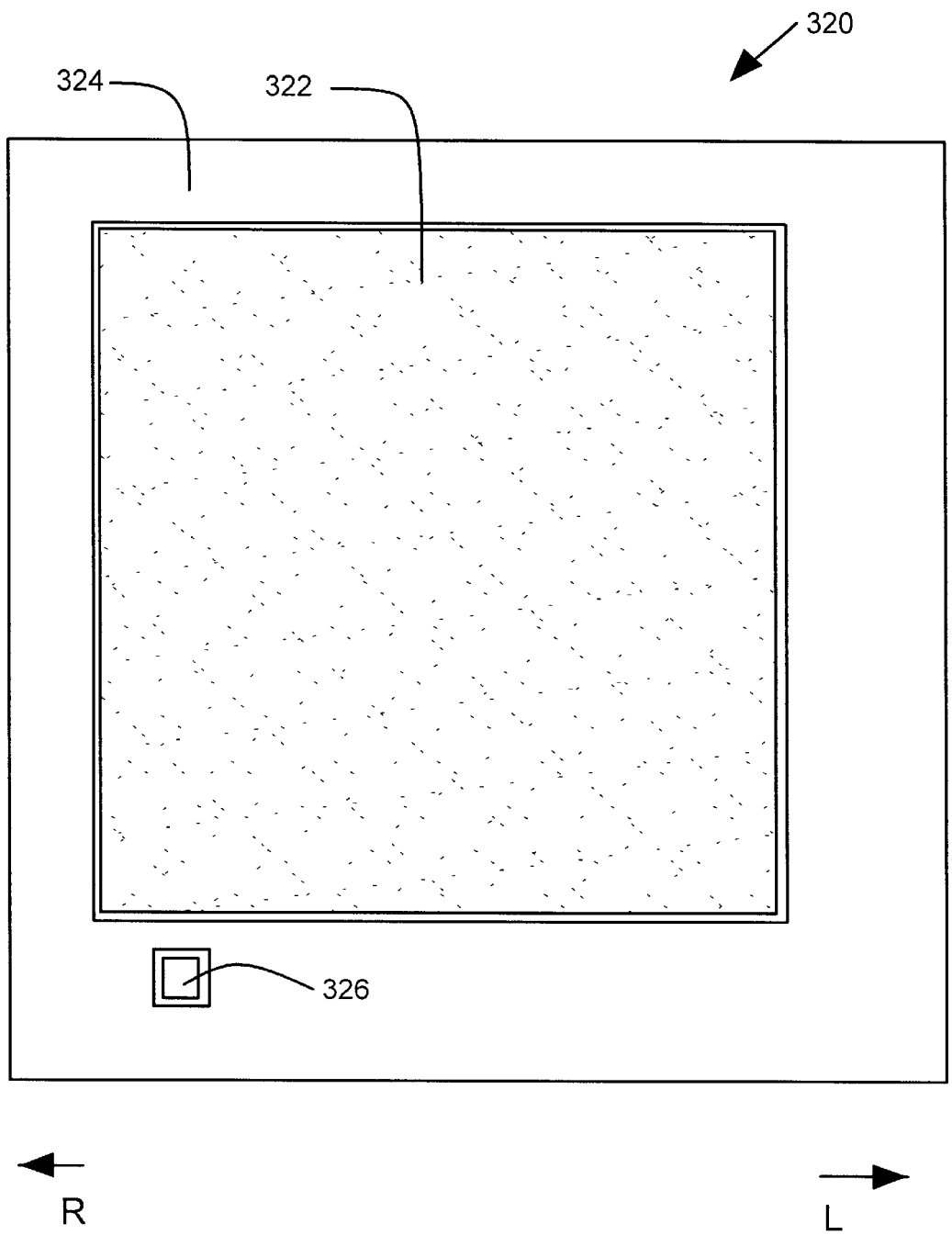
FIG. 7 illustrates a mask for a bottom surface of the sensor layer shown in FIG. 5.

FIG. 7 illustrates a mask 320 for a bottom surface of the sensor layer 110 shown in FIG. 5. Mask 320 includes a region 322 that defines a region to be anisotropically etched on a (100) oriented crystal face of silicon to form the diaphragm 116. Mask 320 also includes a region 324 which is left oxidized and a region 326 which defines a location for the second passageway 136, typically a laser drilled hole.

Figure 8:
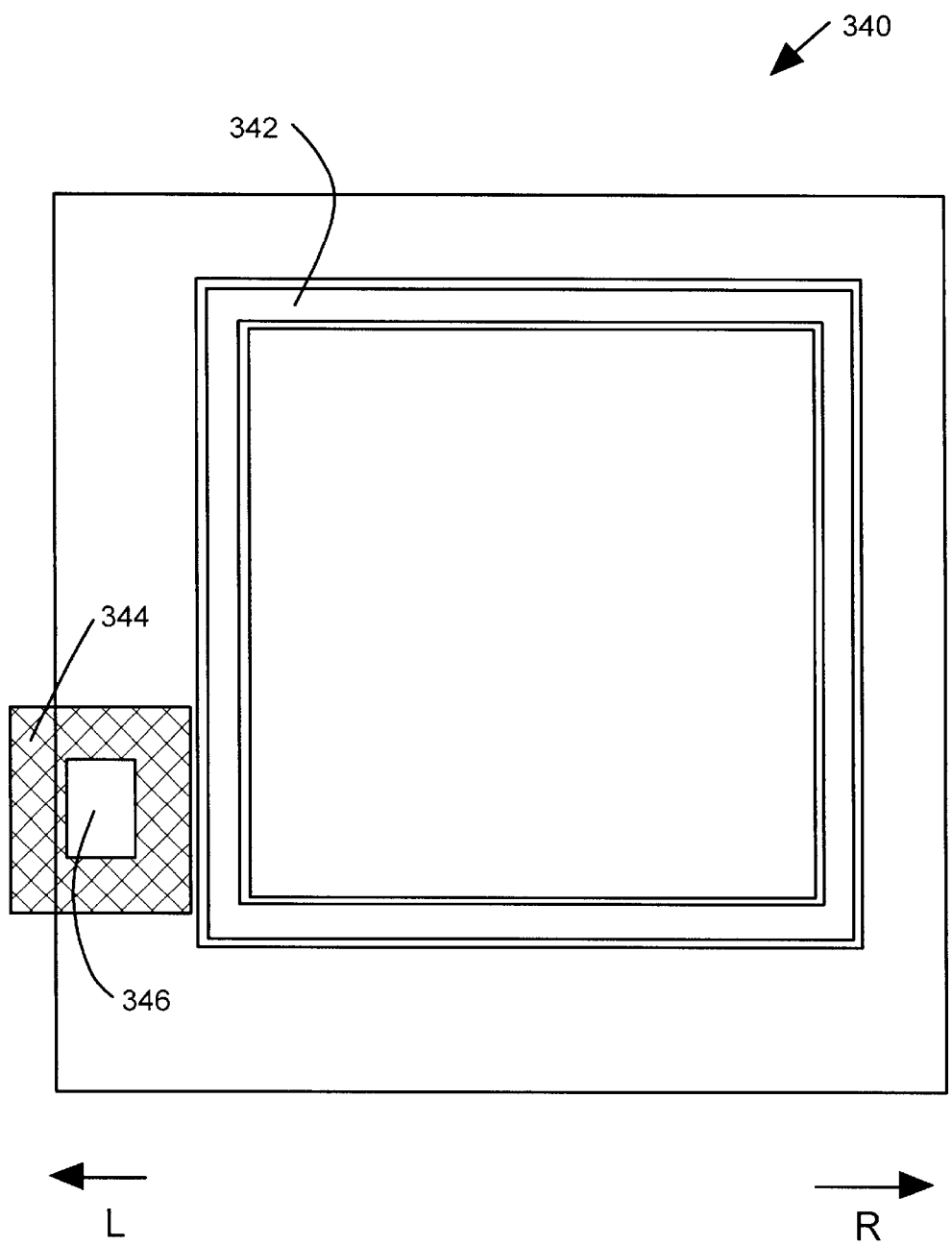
FIG. 8 illustrates a mask for a top surface of the reference layer shown in FIG. 5.

FIG. 8 illustrates a mask 340 for a top surface of the reference layer 120 shown in FIG. 5. Mask 340 includes a region 342 that defines a masked insulating layer 203. Mask 340 also includes a region 344 that circumscribes a region 346 that defines the second electrical bonding pad 134.

FIG. 9 illustrates a mask 360 for a bottom surface of the reference layer 120 shown in FIG. 5. Mask 360 includes regions 362, 364, 366 that define anisotropically etched grooves. These anisotropically etched grooves provide a line 368 for stress concentration so that a batch fabricated sensor 200 can be conveniently diced free from a wafer of multiple sensors. In FIG. 5, the broken-away portions of reference layer 120 are illustrated in dashed lines.

Mask 360 also includes regions 372, 374, 376, 378, 380, 382 that define anisotropically etched grooves such as grooves 201 illustrated in FIG. 5. These grooves provide increased separation between surfaces of the sensor layer 110 and the reference layer 120. The reference layer 120 includes these grooves that face the sensor layer 110. The increased separation reduces "rest capacitance" of the capacitive pressure sensor. The rest capacitance of a capacitive pressure sensor is that value of the sensor's capacitance when the sensor is at rest, or in other words, undeflected. The rest capacitance is unresponsive to pressure changes, and as such tends to undesirably reduce the percentage by which the capacitance changes over the nominal measuring range. Reducing the rest capacitance with grooves simplifies the design of electronic circuitry used with the pressure sensor 200.

Mask 360 also includes a region 384 which defines an etch stop layer forming mesa 121. Mask 360 further includes a region 386 that defines second insulating layer 130. It can be seen that region 342 in FIG. 8 defines masked insulating layer 203, and that region 386 in FIG. 9 defines second insulating layer 130 to have substantially the same shapes that are aligned with each other to provide mechanical stress isolation during temperature variations.

The mask 360 also includes a cul-de-sac region 387 that aligns with the cul-de-sac region 306 in FIG. 6. The reference vacuum cavity 122 is thus shaped to include a cul-de-sac leading to the second passageway 136, which is typically a laser drilled hole.

In one preferred embodiment, the cul-de-sac region 387 includes a turn 388 of at least 90 degrees as illustrated.

FIG. 10 illustrates a partially broken away view of a gage pressure transmitter 400 that includes a barometric sensor 402. Barometric sensor 402 can be constructed generally as described above in connection with FIGS. 1–9. The gage pressure transmitter 400 includes a housing 404 that encloses the barometric sensor 402 that is connected by leads 406 to a printed circuit board 408 that includes a converter circuit. The converter circuit on printed circuit board 408 is explained in more detail below in connection with FIG. 11.

The gage pressure transmitter 400 also includes a process pressure sensor 410 that is connected by leads 412 to the converter circuit on printed circuit board 408. Process pressure sensor 410 is an absolute pressure sensor that senses process pressure at a process pressure inlet 434.

The converter circuit on printed circuit board 408 generates an electrical output that represents gage pressure on leads 414. Leads 414 connect to a terminal block 415 that also serves as sealed feedthrough. Housing 404 is a dual compartment housing with a barrier wall 416 separating an electronics compartment 418 from a field wiring compartment 420. Each of compartments 418, 420 is sealed by a corresponding threaded cover 430, 432. A cable 422 connects the terminal block 415 to a process control system (not illustrated) at a remote location. The electrical output is configured for long distance transmission, also called telemetry, and typically the output at terminal block 415 is in a standard format such as a 4–20 mA industrial process control loop that provides all of the energization for the gage transmitter 400. The 4–20 mA industrial process control loop may include superimposed signals in a standard industry format such as the Hart protocol. Alternatively, the output at terminal block 415 can be in an industry standard fieldbus format such as Foundation Fieldbus, Profibus and the like.

The transmitter housing 404 includes a barometric pressure port 424 that is open to the atmosphere surrounding the housing 404. an inlet of barometric pressure sensor 402 is bonded to the inside of the transmitter over the barometric pressure port. The barometric pressure port 424 preferably includes a porous teflon plug 426 disposed in the barometric pressure port 424. The porous teflon plug 426 help prevent the entry of water in barometric pressure port 424. The barometric pressure sensor 402 is preferably bonded to the housing 404 using a trimetal bond 428 such as Titanium-nickel-gold or Chromium-Nickel-Gold. Trimetal bonds are known for example from U.S. Pat. No. 5,695,590 Willcox et al.

Figure 11:
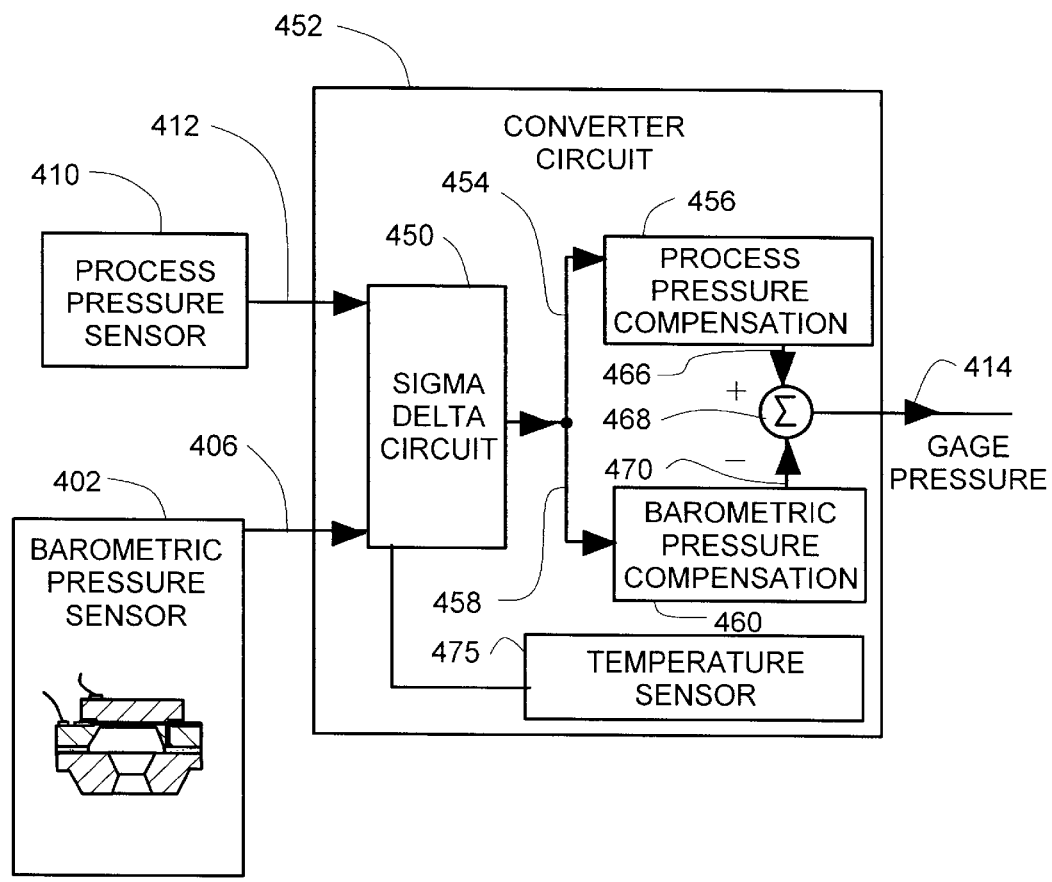
FIG. 11 illustrates a block diagram of a gage pressure transmitter.

FIG. 11 illustrates an exemplary block diagram of the gage pressure transmitter 400 in FIG. 10. The process pressure sensor 410 is coupled along leads 412 to a sigma delta circuit 450 in a converter circuit 452. The barometric pressure sensor 402 is coupled along leads 406 to the sigma delta circuit 450 in the converter circuit 452.

The sigma delta circuit 450 provides a digital signal representative of uncompensated process pressure along line 454 to a process pressure compensation circuit 456. The sigma delta circuit 450 provides a digital signal representative of uncompensated barometric pressure along line 458 to a barometric pressure compensation circuit 460. The process pressure compensation circuit 456 provides an output representing compensated process pressure on line 466 to a difference calculating circuit 468. The barometric pressure compensation circuit 460 provides an output representing compensated barometric pressure on line 470 to the difference calculating circuit 468. The difference calculating circuit 468 calculates a difference between compensated process pressure and compensated barometric pressure, which is an accurate indication of gage pressure 414. The compensation performed by circuits 456, 460 includes gain and linearity corrections.

In a preferred embodiment, the converter circuit also includes a temperature sensor 475 coupled to the sigma delta circuit 450. In this preferred embodiment, the sigma delta circuit 450 provides an output representing temperature to both compensation circuits 456, 460. The compensations circuits 456, 460 then additionally compensate for temperature changes.

In a preferred arrangement, the compensation circuits 456, 460 and the difference calculating circuit 468 are realized as part of an embedded microprocessor system in the gage pressure transmitter 400.

Sigma delta circuit 450 is preferably a sigma delta type analog to digital converter circuit. The converter circuit 452 compensates a reading from the process pressure sensor and compensates a reading from the barometric pressure sensor and calculates the difference by subtracting the compensated barometric pressure reading from the process pressure reading.

Although the present invention has been described with reference to preferred embodiments, workers skilled in the art will recognize that changes may be made in form and detail without departing from the spirit and scope of the invention.

What is claimed is:

1. An absolute pressure sensor, comprising:
   a base layer surrounding a passageway between an inlet adapted to receive a pressure and a mounting face on the base layer;
   a sensor layer having a first face bonded by an insulating bond to the mounting face, the sensor layer including a conductive diaphragm aligned with the passageway, forming a pressure cavity that is between the sensor layer and the base layer, the pressure cavity receiving the pressure; and
   a reference layer mounted on the sensor layer to form a reference vacuum cavity that is aligned with the conductive diaphragm, the reference layer including a conducting surface facing the conductive diaphragm across the reference vacuum cavity to form a pressure sensing capacitor, the conductive diaphragm separating the reference vacuum cavity from the pressure cavity, the conductive diaphragm sensing absolute pressure.

2. The pressure sensor of claim 1 wherein the insulating bond comprises a layer of glass frit.

3. The pressure sensor of claim 1 wherein the conductive diaphragm includes an oxide layer.

4. The pressure sensor of claim 3 wherein the conducting surface supports the oxide layer under an overpressure condition.

5. The pressure sensor of claim 1 wherein the sensor layer further includes a first insulating layer on a second face surrounding the conducting diaphragm, and the reference layer further includes a second insulating layer bonded to the first insulating layer.

6. The pressure sensor of claim 5 wherein the second insulating layer is masked to form a masked shape and the reference layer also includes a third insulating layer opposite the second insulating layer, the third insulating layer being masked in substantially the same masked shape as the second insulating layer.

7. The pressure sensor of claim 5 wherein the reference layer and the sensor layer comprise silicon and the first and second insulating layers comprise silicon dioxide and are fusion bonded together.

8. The pressure sensor of claim 1 wherein the reference layer comprises pyrex glass and is anodically bond ed to the sensor layer.

9. The pressure sensor of claim 1 further comprising a first electrical bonding pad disposed on the sensor layer and connected to the pressure sensing capacitor.

10. The pressure sensor of claim 9 further comprising a second electrical bonding pad connected to the pressure sensing capacitor.

11. The pressure sensor of claim 10 wherein the first electrical bonding pad is in electrical contact with the sensor layer, and the second electrical bonding pad is disposed on a pyrolytic oxide isolation channel on the sensor layer and is in electrical contact with the conducting surface.

12. The pressure sensor of claim 1 wherein the sensor layer further comprises a second passageway extending from the reference vacuum cavity to the insulating bond.

13. The pressure sensor of claim 12 wherein the second passageway is a laser drilled hole.

14. The pressure sensor of claim 13 wherein the reference vacuum cavity is shaped to include a cul-de-sac leading to the laser drilled hole.

15. The pressure sensor of claim 14 wherein the cul-de-sac includes a turn of at least 90 degrees.

16. The pressure sensor of claim 1 wherein the reference layer includes at least one groove facing the sensor layer.

17. The pressure sensor of claim 1 wherein the reference layer includes a mesa that faces the conductive diaphragm.

18. The pressure sensor of claim 1 wherein the sensor layer includes a shelf portion that extends beyond the reference layer, and at least one electrical bonding pad is disposed on the shelf portion.

19. The pressure sensor of claim 1 wherein the pressure sensor is a barometric pressure sensor having an operating range of at least 0.9–1.1 atmospheres.

20. A gage pressure transmitter that includes a barometric pressure sensor, the barometric pressure sensor comprising:
 a base layer surrounding a passageway between an inlet adapted to receive a pressure and a mounting face on the base layer;
 a sensor layer having a first face bonded by an insulating bond to the mounting face, the sensor layer including a conductive diaphragm aligned with the passageway, forming a pressure cavity that is between the sensor layer and the base layer, the pressure cavity receiving the pressure; and
 a reference layer mounted on the sensor layer to form a reference vacuum cavity that is aligned with the conductive diaphragm, the reference layer including a conducting surface facing the conductive diaphragm across the reference vacuum cavity to form a pressure sensing capacitor, the conductive diaphragm separating the reference vacuum cavity from the pressure cavity, the conductive diaphragm sensing absolute pressure.

21. The gage pressure transmitter of claim 20 further comprising:
 a transmitter housing, the transmitter housing having a barometric pressure port bonded to the inlet.

22. The gage pressure transmitter of claim 21 further comprising a porous teflon plug disposed in the barometric pressure port.

23. The gage pressure transmitter of claim 20, further comprising:
 a process pressure sensor; and
 a converter circuit coupled to the process pressure sensor and the barometric pressure sensor, the converter circuit calculating a difference between process pressure and barometric pressure.

24. The gage pressure transmitter of claim 23 wherein the converter circuit includes a sigma delta analog to digital converter.

25. The gage pressure transmitter of claim 23 wherein the converter circuit compensates a reading from the process pressure sensor and compensates a reading from the barometric pressure sensor and calculates the difference by subtracting the compensated barometric pressure reading from the process pressure reading.

* * * * *